US006478831B2

(12) United States Patent
Tselesin

(10) Patent No.: US 6,478,831 B2
(45) Date of Patent: Nov. 12, 2002

(54) ABRASIVE SURFACE AND ARTICLE AND METHODS FOR MAKING THEM

(75) Inventor: Naum N. Tselesin, Atlanta, GA (US)

(73) Assignee: Ultimate Abrasive Systems, L.L.C., Atlanta, GA (US)

( * ) Notice: Subject to any disclaimer, the term of this patent is extended or adjusted under 35 U.S.C. 154(b) by 0 days.

(21) Appl. No.: 09/736,380

(22) Filed: Dec. 15, 2000

(65) Prior Publication Data

US 2001/0025457 A1 Oct. 4, 2001

Related U.S. Application Data

(60) Continuation-in-part of application No. 09/055,217, filed on Apr. 6, 1998, now Pat. No. 6,273,083, which is a division of application No. 08/480,715, filed on Jun. 7, 1995, now Pat. No. 5,791,330.
(60) Provisional application No. 60/172,151, filed on Dec. 17, 1999.

(51) Int. Cl.[7] .............................................. B24D 18/00
(52) U.S. Cl. .............................. 51/293; 51/307; 51/309; 51/308; 51/295
(58) Field of Search ......................... 51/293, 309, 307, 51/308, 295; 427/272, 282, 287; 156/230, 276, 279

(56) References Cited

U.S. PATENT DOCUMENTS

| 2,268,663 A | 1/1942 | Kuzmick | 51/206 |
| 2,811,960 A | 11/1957 | Fessel | 125/15 |
| 2,876,086 A | 3/1959 | Raymond | 51/298 |
| 3,127,715 A | 4/1964 | Christensen | 51/206 |
| 3,176,675 A | 4/1965 | Bomba | 125/15 |
| 3,353,526 A | 11/1967 | Daem | 125/15 |
| 3,537,491 A | 11/1970 | Kolesh | 143/133 |
| 3,742,655 A | 7/1973 | Oliver | 51/356 |
| 4,481,016 A | 11/1984 | Campbell et al. | 51/295 |
| 4,525,179 A | 6/1985 | Gigl | 51/209 |
| 4,554,117 A | 11/1985 | Ezis et al. | 264/67 |
| 4,668,248 A | 5/1987 | Dettelbach | 51/293 |
| 4,679,541 A | 7/1987 | Fish | 125/51 |
| 4,793,828 A | 12/1988 | Burnand | 51/293 |
| 4,925,457 A | 5/1990 | DeKok et al. | 51/293 |
| 5,049,165 A | 9/1991 | Tselesin | 51/295 |
| 5,092,910 A | 3/1992 | Dekok et al. | 551/295 |
| 5,096,465 A | 3/1992 | Chen et al. | 51/295 |
| 5,147,001 A | 9/1992 | Chow et al. | 175/428 |
| 5,190,568 A | 3/1993 | Tselesin | 51/293 |
| 5,203,880 A | 4/1993 | Tselesin | 51/293 |
| 5,215,072 A | 6/1993 | Scott | 125/21 |
| 5,238,074 A | 8/1993 | Tibbitts et al. | 175/428 |
| 5,380,390 A | 1/1995 | Tselesin | 156/230 |
| 5,518,443 A | 5/1996 | Fisher | 451/540 |
| 5,791,330 A | 8/1998 | Tselesin | 125/15 |
| 5,980,678 A | * 11/1999 | Tselesin | 156/230 |
| 6,039,641 A | 3/2000 | Sung | 451/540 |
| 6,110,031 A | 8/2000 | Preston et al. | 451/541 |
| 6,196,911 B1 | 3/2001 | Preston et al. | 451/548 |

FOREIGN PATENT DOCUMENTS

| CH | A-0611202 | 5/1979 | |
| CN | 2032111 U | 8/1969 | |
| DE | 2540204 | 7/1977 | ................ 125/15 |
| DE | U-8804035 | 3/1988 | |
| DE | U-9110796 | 8/1991 | |
| EP | 0 086 086 | 8/1983 | |
| EP | 0 527 344 A2 | 2/1993 | |
| EP | 0 774 242 A2 | 11/1996 | |
| FR | A-2091496 | 1/1972 | |
| GB | A-0580867 | 9/1946 | |
| GB | 580867 | 9/1946 | |
| GB | 1167606 | 10/1969 | |
| JP | 35-6296 | 6/1960 | |
| JP | 53-69994 | 6/1978 | |
| JP | 54-82788 | 7/1979 | |
| JP | 55-58983 | 5/1980 | |
| JP | 53-6296 | 6/1980 | |
| JP | 56-116166 | 9/1981 | |
| JP | 57-132973 | 8/1982 | |
| JP | 040268 | 3/1983 | ................ 125/15 |
| JP | 59-115163 | 7/1984 | |
| JP | 59-191256 | 12/1984 | |
| JP | 60-92406 | 5/1985 | |
| JP | 61-142076 | 6/1986 | |
| JP | 62-181363 | 11/1987 | |
| JP | 62-255069 | 11/1987 | |

(List continued on next page.)

OTHER PUBLICATIONS

GranQuartz Stone Tools and Equipment, vol. 1–2000, pp. 22 and 23, no month.
"Fundamentals of Designing and Technology of Manufacturing Abrasive and Diamond Tools," Edited by Yu M. Kevalchuk, Moscow, Mashinostroenie Publishing House, 1984, pp. 172–174, w/English translation of Official Action issued by Russian Patent Office indicating relevance of reference, No month.

*Primary Examiner*—Michael Marchesori
(74) *Attorney, Agent, or Firm*—Finnegan, Henderson, Farabow, Garrett & Dunner, L.L.P.

(57) ABSTRACT

A method for making an abrasive material comprising a plurality of hard particles providing the abrasive quality distributed in a retaining matrix for holding the particles in place, the method comprising the steps of placing a mask having openings therein against a carrier capable of supporting a plurality of the particles, providing an affixing capability to an outer side of the mask remote from the carrier to which hard particles will adhere, applying a plurality of hard particles to the outer side of the mask so that a portion of the particles pass through the openings of the mask and form a pattern of the particles on the carrier corresponding to the openings of the mask and another portion of the particles adhere to the mask, separating the mask containing the hard particles adhered to it from the carrier leaving the pattern of the particles on the carrier, at least partially surrounding the particles on the carrier with a retaining matrix material, and heating the retaining matrix material to cause the material to form a retaining matrix that holds the particles in the pattern.

32 Claims, 9 Drawing Sheets

FOREIGN PATENT DOCUMENTS

| | | |
|---|---|---|
| JP | 62-264869 | 11/1987 |
| JP | 63-34075 | 2/1988 |
| JP | 63-34077 A | 2/1988 |
| JP | 1-205975 | 8/1989 |
| WO | 98/45091 | 10/1998 |
| WO | 98/45092 | 10/1998 |
| WO | WO 98/51448 | 11/1998 |
| WO | Wo 99/28088 | 6/1999 |
| WO | 99/39876 | 8/1999 |

\* cited by examiner

ABRASIVE SURFACE AND ARTICLE AND METHODS FOR MAKING THEM

RELATED APPLICATIONS

This application is a continuation-in-part of application Ser. No. 09/055,217 filed Apr. 6, 1998 U.S. Pat. No. 0,273,083 which is a Divisional application of Ser. No. 08/480,715 filed Jun. 7, 1995, now U.S. Pat. No. 5,791,330, and claims priority of provisional application Serial No. 60/172,151 filed Dec. 17, 1999.

BACKGROUND OF THE INVENTION

This invention relates generally to abrasive and wear resistant surfaces and articles comprising these surfaces. More specifically, it discloses new and improved methods for obtaining such surfaces containing non-randomly distributed hard particles that provide abrasive and wear resistant quality to the surfaces.

U.S. Pat. Nos. 4,925,457; 5,092,910; and 5,049,165 as well as 5,380,390; 5,203,880; 5,190,568; 5,817,204; 5,620,489; 5,991,330; and 5,980,678, all of which are incorporated herein by reference, all teach methods for providing a uniform distribution of hard particles in a non-random manner on the surface of an abrasive article.

International Publication WO 98/51448 discloses placing a perforated stencil or mask against a tool preform so that the perforations define cavities, filling and packing these cavities with a metal braising composition in the form of paste and then removing the stencil leaving discrete particles of braising paste tacked to the cutting surface. Hard particles (abrasive grains) are deposited onto the paste particles or pre-mixed with paste particles and fixed in place by firing the preform at braising conditions.

In U.S. Pat. Nos. 5,380,390; 5,817,204; and 5,980,678, all of which are incorporated herein by reference, various adhesive materials and at least one mask are used for forming a non-uniform distribution of and for holding hard particles on substrates and/or carriers prior to thermal processing of the composite abrasive material. For example, an abrasive material can be formed by coating a substrate with an adhesive, placing a mask over the adhesive coated substrate, contacting this substrate with a quantity of hard, abrasive particles so that the particles pass through the openings of the mask and adhere to the substrate, and then removing all of the plurality of the particles not held by the adhesive and optionally also removing the mask. The particles remaining in a pattern in the substrate are then surrounded with a sinterable or fusible matrix material while the particles are temporarily held by the adhesive. Subsequent treatment with heat and/or pressure completes the abrasive material.

The mask may take a form of a mesh or other cellular material that is placed against the substrate before contacting the substrate with the hard particles. The mask will then determine the distribution of the hard particles and/or zones or clusters of the particles according to the openings of the mesh or other cellular material. Further, the mask can be removed prior to heating or left to become an integral part of the abrasive material. Moreover, as described in the patents, the substrate can be a preform of sinterable matrix material and the hard particles can be urged or compacted into it with various compressing means, such as roll compaction of the pre-positioned hard particles before sintering of the material.

As further noted in the patents, the matrix material can be a sinterable or fusible material and can be deposited by a temperature related process such as thermal (e.g., plasma) spray or vapor deposition, thermal deposition of material being considered an equivalent of sinterable material. As a variation of sintering, the matrix material may also be impregnated with a fusible material by placing a fusible material on at least one side of the assembly before beginning the heating/or compaction, the fusible material melting during heating and being carried into the matrix material by capillary action.

U.S. Pat. No. 5,620,489, which is incorporated herein by reference, discloses a sinterable matrix material in the form of a soft, easy deformable and flexible preform made from a mixture of a quantity of powdered sinterable matrix material and a liquid binder composition. A plurality of abrasive particles can then be included at least partially in the preform which is then sintered to form an abrasive article. For example, the binder-powder mixture can be dispensed onto a support surface, and doctored to uniform thickness by a doctor blade for forming the preform. The plurality of abrasive particles can be included in the perform, e.g., by placing the particles on at least one side of the preform and then urging the particles into the preform. The abrasive particles can be urged into the preform before the preform is sintered or during sintering. Moreover, the particles can be included in the preform in a random manner or in a non-random manner that can be defined by a cellular type mesh or mask material.

U.S. Pat. No. 5,791,330, which is incorporated herein by reference, relates to similar abrasive materials having a non-random distribution of abrasive particles and teaches that the mesh material, after being used to position the abrasive particles, may be partially or completely removed either physically prior to sintering the matrix material, or dissolved or evaporated at the temperature used to sinter the matrix material leaving the abrasive particles uniformly distributed within matrix material. The patent also discloses that structural members can be positioned between or at least on one side of the matrix material, abrasive particles, and mesh materials and can be of metallic or non-metallic compounds, powder, fibers, meshes, shims, foils and any combinations thereof. The composition of the structural members can be different from the composition of the matrix material and they can be sintered or brazed, preferably under pressure, to the sintered abrasive material. The patent also discloses as suitable sinterable matrix materials or a component of sinterable matrix materials, compositions comprising carbide forming elements, such as boron, chromium, iron with zinc and without zinc and that braising and fusing materials can be used as additives with the compositions.

SUMMARY OF THE INVENTION

The present invention provides a new and improved method for making articles, including but not limited to abrasive and wear resistant articles containing hard, abrasive particles distributed in a desired, preferably non-random or non-uniform pattern in the articles that is more suitable for mechanization, automation, and mass production.

In accordance with the invention, there is provided. a method for making an abrasive material comprising a plurality of hard particles providing the abrasive quality distributed in a retaining matrix for holding said particles in place, said method comprising the steps of placing a mask having openings therein against a carrier capable of supporting a plurality of said particles, providing affixing means on an outer side of said mask remote from said carrier to which hard particles will adhere, applying a plurality of particles to said outer side of said mask so that a portion of the particles pass through the openings of the mask and form a pattern of said particles on said carrier corresponding to the openings of the mask and another portion of the particles adhere to said mask, separating the mask containing the hard particles adhered to if from the carrier leaving the pattern of said particles on the carrier, at least partially surrounding the particles on the carrier with a retaining matrix material, and heating said retaining matrix material to cause said material to form a retaining matrix that holds said particles in said pattern.

BRIEF DESCRIPTION OF THE DRAWINGS

The detailed features and advantages of the invention will now be explained in connection with the accompanying drawings, in which.

DETAILED DESCRIPTION OF THE INVENTION

Figure 1:
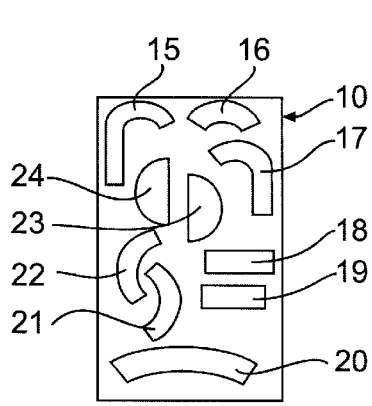
FIG. 1 is a plan view of a mask illustrating various shapes of cutting segments to be made by the process of the present invention.

In general, the process of the invention comprises selecting at least one mask, (e.g., a stencil, template, cellular type material, mesh, etc.) having openings therein and placing it against or assembling it with a carrier or substrate capable of supporting or carrying temporarily and/or permanently at least some of the hard particles.

The assembly of the mask and the carrier then receives a quantity of the hard particles, some of which go through the openings of the mask and are fixed to or rest on the carrier and another portion of which go onto the mask and rest on the spaces of the mask between the openings.

In accordance with the invention, the outer surface of the mask opposite the surface adjacent the carrier is provided with affixing means to which the particles will adhere to hold the particles on the spaces on the outer surface of the mask. Then, the mask having the hard particles adhered thereto is separated from the carrier, the separated mask thereby effectively and efficiently removing the plurality of hard particles that will not form a part of the final abrasive product. By removing the hard particles that will riot form a part of the abrasive. material in this manner, less particle dust is created during the process and it makes it easier and more efficient to recover them, for example, for reuse or sale. It further minimizes the chance that unwanted hard particles become a part of the abrasive material.

This results in leaving a distributed pattern of hard particles on the carrier. The hard particles are distributed on the carrier according to the design of the mask primarily according to the size, shape and distribution of the openings of the mask as well as by. the size and shape of the hard particles. Thus a programmed or non-random distribution of the hard particles is provided on the carrier.

At this stage, the support or temporary retention of the hard particles on the carrier can be provided by the characteristics of the carrier and/or the hard particles as well as the surface characteristics of the carrier or hard particles, such as coating materials applied to the carrier and/or hard particles, moisture content, humidity, weight, (utilization of gravity temperature) temperature (e.g., negative temperature), magnetization, static electricity, discharge conditions, etc. In addition, after placing of the particles on the carrier, further substances can be applied to more permanently affix the particles to the carrier. The mask can be removed from the carrier before, during, or after such fixing of the hard particles to the carrier. Removal of the mask during, simultaneously or immediately after the process of fixing constitutes the most preferred embodiments of this invention.

Following removal of the mask, the hard particles adhered thereto are preferably separated from the mask, recovered, and then utilized again for making further abrasive materials.

Means for affixing the hard particles to the mask and also to each other if desired include an adhesive coating on the mask or anchoring through surface roughness. Also available are masks made from a substance that is inherently tacky. However, any means that holds the particles to the outer surface of the mask so that they are removed when the mask is separated from the carrier is acceptable.

Preferably, the hard particles that are not affixed to the mask and/or the carrier and/or to each other are removed from the carrier and the mask or their assembly, forming a further plurality of the hard particles that can be collected and utilized again for making abrasive materials. These hard particles can be removed by any suitable method including, but not limited to, utilization of gravity, brushing, blowing, blasting, picking, suctioning, vacuum, scraping, shacking, tapping, vibrating, heating, magnetization, demagnetization, electrical charging and discharging.

After placing the hard particles on the carrier and removal of the mask, this assembly is subjected to further processing. This processing can include at least one or more of the following:

The particles can be urged into the carrier at least partially to enhance their retention therein or by locking these hard particles in place. This urging and/or locking can be provided before, during, or after removal of the mask from the carrier.

Providing the carrier and hard particles with a permanent retaining matrix material (e.g., a sinterable, depositable, fusible, brazible or thermal setting material).

Providing a permanent retention between the hard particles and the carrier directly and/or through the retaining matrix material by various processes of heating, sintering, braising, fusing, molding, casting, depositing (i.e., electrical or thermal depositing), plating, etc.; all with or without pressure, special atmospheres or vacuums; and any combinations thereof .

As a result of these further processings, the hard particles are permanently (for the life of the hard particles in the abrasive tool) fixed or bonded in the retaining matrix and/or to the carrier and optionally to each other.

Figure 2:
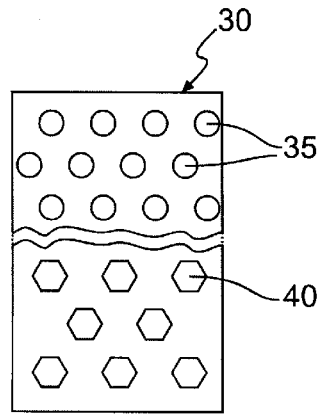
FIG. 2 is a plan view of another mask illustrating alternative shapes of cutting segments.

With reference to the drawings, and to those embodiments of the invention chosen for illustration, FIGS. 1 and 2 show examples of masks having openings suitable for use in the present invention that can be templates, stencils, cellular materials, or mesh materials. These masks can be made by many ways, including but not limited to perforation, drilling, cutting, braising, welding and gluing, or by laser. Mask 10, shown in FIG. 1, comprises a plurality of through openings 15–24, each of which is different. Mask 30, shown in FIG. 2, shows a plurality of round openings 35 and a plurality of polygon openings 40.

Figure 3:
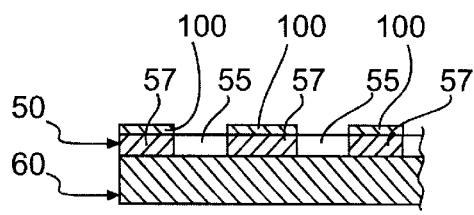
FIG. 3 is a cross-sectional view of an assembly showing a mask similar to that of FIGS. 1 or 2 on a surface of a carrier.

FIG. 3 is a cross section of an assembly of a mask 50, similar to mask 10 or 30, having through openings 55 and mask sections 57 between the through openings 55, resting on a carrier.60. In accordance with the invention, the side of the mask remote from the carrier is provided with affixing means, such as a coating of adhesive 100, to which the particles will adhere. Alternatively, the mask could be made of an inherently tacky substance or become tacky, for example, under the influence of light or temperature so that the particles will adhere directly to it. However, any means that holds the particles to the outer surface of the mask so that they adhere to it is acceptable.

The carrier can be any type of substrate that is capable of supporting and/or at least temporarily holding a plurality of hard particles. As discussed in more detail below, the carrier may be a plate (e.g., a metallic one,), foil, mesh-type material (e.g., a wire mesh or a non-wire cellular material) or a preform of sinterable material that forms a part of the abrasive material or it may be a substrate that is subsequently removed from the abrasive material after it is formed.

Figure 4:
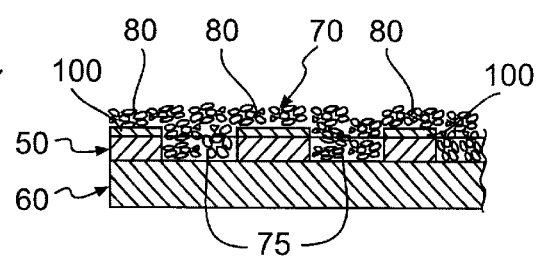
FIG. 4 is a cross-sectional view of the assembly of FIG. 3 with a plurality of hard particles applied to it.
Figure 5:
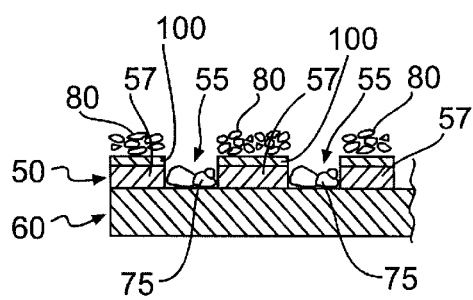
FIG. 5 is a view similar to FIG. 4 showing the assembly after removal of particles not adhering to the mask, the carrier or each other.

FIG. 4 shows the application of a plurality of hard particles 70 on top of mask 50 and carrier 60 so as to cover the surface of the mask and the carrier. Some of the hard particles 75 will go through the openings 55 of mask 50 and rest on the carrier and some of the hard particles 80 will go onto sections 57 of the mask where they are held in place by adhesive 100. The hard particles thus rest on and/or are fixed to the mask and the carrier as well as each other. FIG. 5 shows how the assembly looks after removing hard particles, if desired, that have not been held to the mask or by openings 55.

Figure 6:
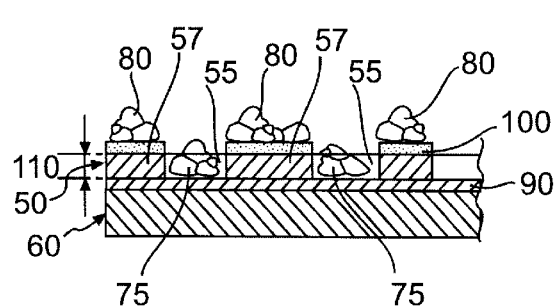
FIG. 6 is a view similar to FIG. 5 showing the use of an adhesive coating to assist in adhering the particles to the carrier.

As shown in FIG. 6, the surface of carrier 60 adjacent mask 50 can also be provided with affixing means so that the hard particles that pass through openings 55 will adhere to it. Thus between carrier 60 and mask 50 there can be provided a coating layer, for example, a thin film of an adhesive 90 to which the hard particles in openings 55 adhere. This assists in keeping particles in openings 55 as the plurality of particles not adhering to mask 50 are removed as shown in FIG. 5. The hard particles can also be fixed to each other by a natural electrical static, mechanical interlocking by spraying them with an adhesive substance, liquid and/or a frizzed and/or magnetized substance.

Figure 7:
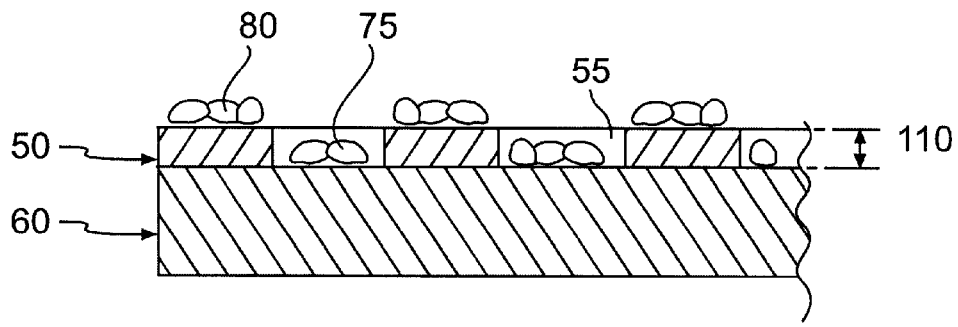
FIG. 7 is a view similar to FIG. 5 showing a variation in the type of particles used.

FIG. 7 shows alternatively that after removing all hard particles not held by the carrier or the mask, only a single layer of hard particles 80 and a single layer of particles 75 can be left affixed to mask 50 and carrier 60 directly or through adhesive substances 90 and 100.

Figure 8:
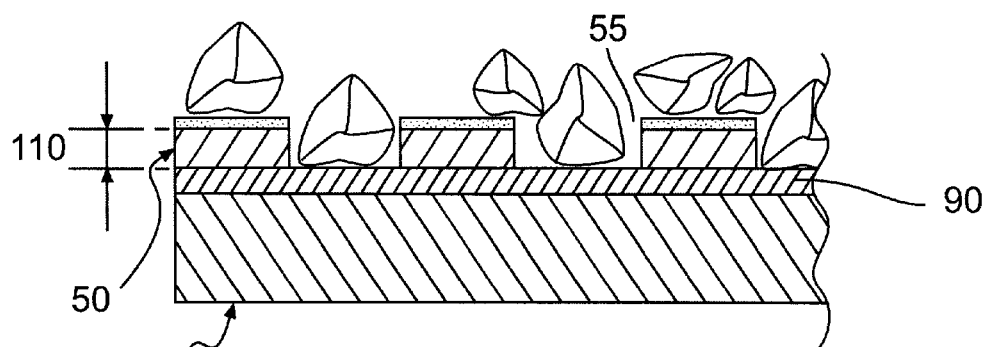
FIG. 8 is a view similar to FIG. 7 showing yet a further variation in the type of particles.

It should be understood, that depending upon the average size of the hard particles and the dimensions of openings 55, and the thickness 110 of mask 50, hard particles 75 can be arranged in a pile or column within openings 55 as shown in FIG. 6 or form a single layer as shown in FIG. 7 or there can be just a single particle in each opening 55 as shown in FIG. 8. FIG. 8 shows an adhesive layer 90. It should be understood that this layer 90 can be an independent element or a part of or attached/adhered to mask 50 or carrier 60.

The inner surface of the mask also can be provided with an affixing means to which the adjacent surface of the carrier will adhere. In this case the affixing means should prevent a tearing-off or breakage of the mask and/or the substrate in the process of separating the mask from the substrate. Examples of such affixing means can be a low tacky adhesive (e.g., a pressure sensitive one) and a suction/release action, for example, through pores or openings or channels in the[]substrate or carrier.

Figure 9:
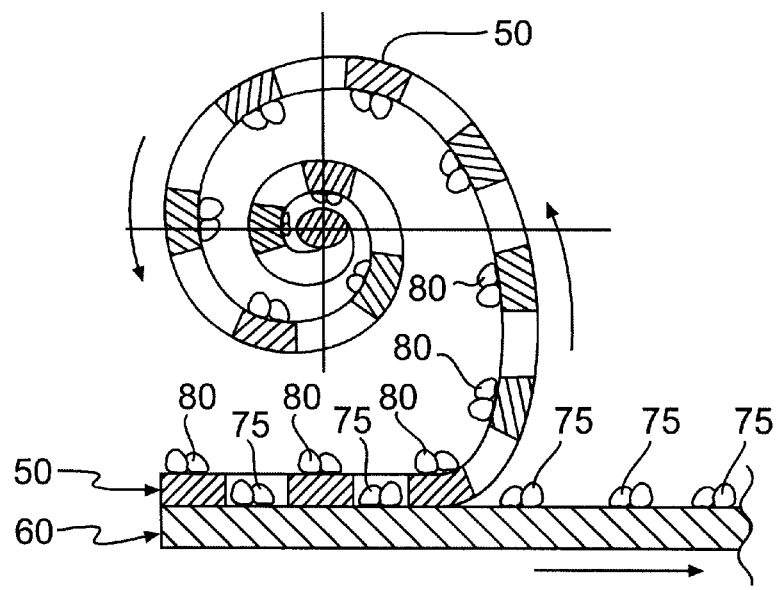
FIG. 9 is a schematic view showing separation of the mask having particles adhered to it from the carrier.

In accordance with the invention, after the particles have been applied to the carrier and mask and any excess or non-affixed particles removed if desired, the mask containing particles 80 adhered to it is separated from the carrier leaving a pattern of particles 75 on carrier 60. FIG. 9 illustrates schematically a process of separating mask 50 and carrier 60 from each other. In the process of separation as well as after the separation, mask 50 retains preferably all, but at least the majority of the hard particles 80, and carrier 60 the hard particles 75. More specifically, as shown in FIG.

9, mask 50 can be removed from carrier 60 by separating it from the carrier and coiling it up in a roll. It is to be understood that the process of separation can be in a continuous or semi-continuous manner or in a discreet or batch manner.

To aid in this separation of mask 50 from carrier 60, adhesive substance 90, if used, should not make it difficult to separate them from each other. Thus substance 90 in the most cases should be sufficiently tacky so that particles 75 will adhere to it, but not so strong that it makes it difficult to separate mask 50 from the carrier.

Figure 9A:
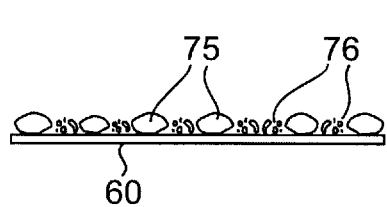
FIGS. 9A and B are schematic representations showing a method for fixing the particles in retaining matrix material.

In accordance with the invention, following separation of the mask from the carrier, the particles 75 left on the carrier are in contact with or are at least partially surrounded with a retaining matrix material. As shown in FIG. 9A, this can be, for example, a powdered sinterable matrix material 76, which is then heated to melt or sinter the material and hold particles 75 in the desired pattern and form an abrasive material. The carrier can be a part of the abrasive material or it can be removed following sintering.

Figure 9B:
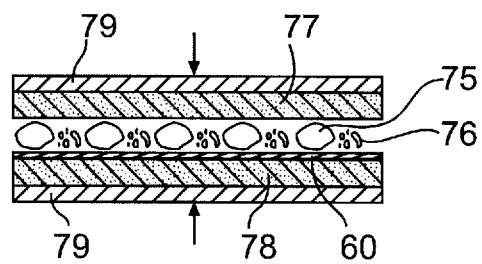

Alternatively, a preform of sinterable matrix material can be applied to one or both sides of the structure in addition to or in lieu of the material 76 or other retention type material. FIG. 9B illustrates the situation where a preform 77 and 78 of sinterable material is applied to both sides of the assembly of FIG. 9A, after which plates 79 will exert pressure on the assembly and heat will be applied to sinter the abrasive material. Material 76 can be omitted, or it can be a powdered sinterable matrix material or a fusible material. If material 76 is a fusible material, it will melt at or below the final temperature of sintering of the preforms and assist in adhering the particles to one another and the retaining matrix provided by the preforms. Alternatively, the carrier 60 could be a preform of sinterable material that by itself will form a retaining matrix to hold the particles 75 during the above-described process of making the abrasive material.

Figure 10:
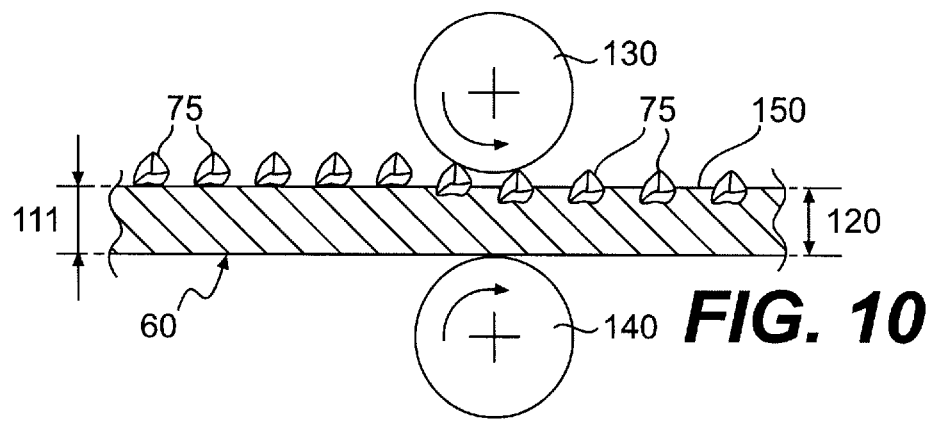
FIG. 10 is a schematic view showing compaction of particles into a carrier.

Further processing of carrier 60 and hard particles 75 after removal of the mask and before heating includes urging the particles into the carrier with a pair of opposed compacting means, e.g., rolls 130, 140 as shown in FIG. 10, particularly if carrier 60 is a preform of sinterable matrix material. The compacting rolls urge the hard particles 75 into carrier 60, deforming it. The original thickness 111 of the carrier 60 may be changed under some conditions of compacting or deforming, the resulting thickness 120 being smaller than the original thickness 111. The width (not shown in the Figures) of carrier 60 also may change under such compaction.

Figure 11:
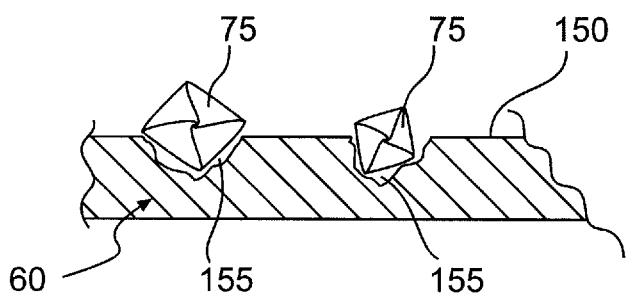
FIG. 11 is an enlarged view showing the particles embedded in the carrier as a result of the compaction of FIG. 10.

During compacting, the hard particles 75 can be at least partially or completely embedded in carrier 60. Different applications of the final products may require different levels of protrusion. In one embodiment of the invention, production of a single layer face grinding tool, there should be a protrusion of the hard particles over the surface 150 of the carrier 60 as shown in. FIG. 11. Depending upon the nature of carrier 60, hard particles 75 and the depth of penetration of the hard particles 75 into carrier 60, the hard particles 75 can rest comfortably in nests 155 and thereby be anchored in the carrier. Other applications require preferably complete protrusion of the hard particles 75 into carrier/perform 60.

With reference to FIGS. 6 and 8 and related descriptions, and considering FIG. 11, if adhesive substance 90 is present in nests 155 as a result of urging/compaction, it can be removed, along with any present on the carrier, e.g., by a heat, burn-out, suction action, vacuum or dissolving procedure. Removing substance 90, if present, can be an important step in manufacturing in order to reduce organic material, water and generation of gases under heat, especially for providing a clean process environment and a good retention between hard particles 75 and any permanent retaining material. It is particularly important for sintering, braising, fusing, electro-depositing and thermal setting, all with or without utilization of negative (vacuum) and/or protective and/or reduction atmospheres.

Figure 12:
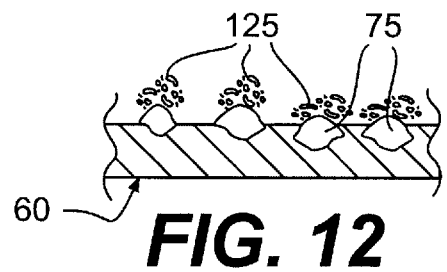
FIG. 12 shows the material of FIG. 11 with a supplemental retention material applied to it.

With reference to FIG. 12, after urging/compaction of the particles 75 into carrier 60, a supplemental retention material 125 can be applied to the hard particles 75 and optionally at least partially to the carrier. The reason for calling this material 125 "supplemental" is that the carrier 60 by itself may also be providing a retaining matrix for the hard particles, particularly if it is of a sinterable matrix material. The supplemental retention material after proper treatment, will assist in permanently bonding hard particles 75 to carrier 60.

If carrier 60 is not a sinterable material but, for example, a metallic foil or a plate or mesh-type material, the "supplemental" material 125 can be the only one that provides integrity of the hard particles and the carrier 60. In this case the "supplemental" material 125 can function as a truly braze material according to the definition of the function of the braze process: integrating parts together via a liquid and then solidifying of the braze material. Therefore in this case the braze melts under heat (with a load and/or pressure applied or not) and then solidifies (with a load and/or pressure applied or not) in the process of manufacturing the abrasive material. If the braze material is combined with (mixed with or applied onto) a non-braze type sinterable material, the braze, which melts at the proper temperature, can infiltrate into the skeleton (capillary channels) of said non-braze type sinterable material.

This supplemental retention material can be in the form of a powder, chips, fibers, paste, slurry, tape, sheet, chopped, or crushed pieces of a solid material, cold compacted powders, molten metallic, preferably atomized materials and electrolytical solutions. It can be of metallic (e.g., metallic and alloy powders and mixtures) or non-metallic materials (e.g., thermal plastics, resins, epoxies.) The retention material can be chosen from pre-sintered or fully sintered powder material, cast powder tape, roll compacted powder tape or plate, including cellular type material and metallic based mesh material.

It should be noted that if mask 50 is not removed from carrier 60 at the time the supplemental retention material is applied, it can also be used to assist in holding particles 80 to the mask to aid in their subsequent removal with the mask. It should also be noted that if hard particles 80 include any retention material, to allow their recovery for future use following their removal with the mark, the retention material should be able to be separated from them. Specifically, the hard particles should be cleaned of the retention material prior to returning them for further use. Nevertheless, in some cases the removed hard particles can be returned for reuse even with the presence of traces of the retention material.

Figure 13:
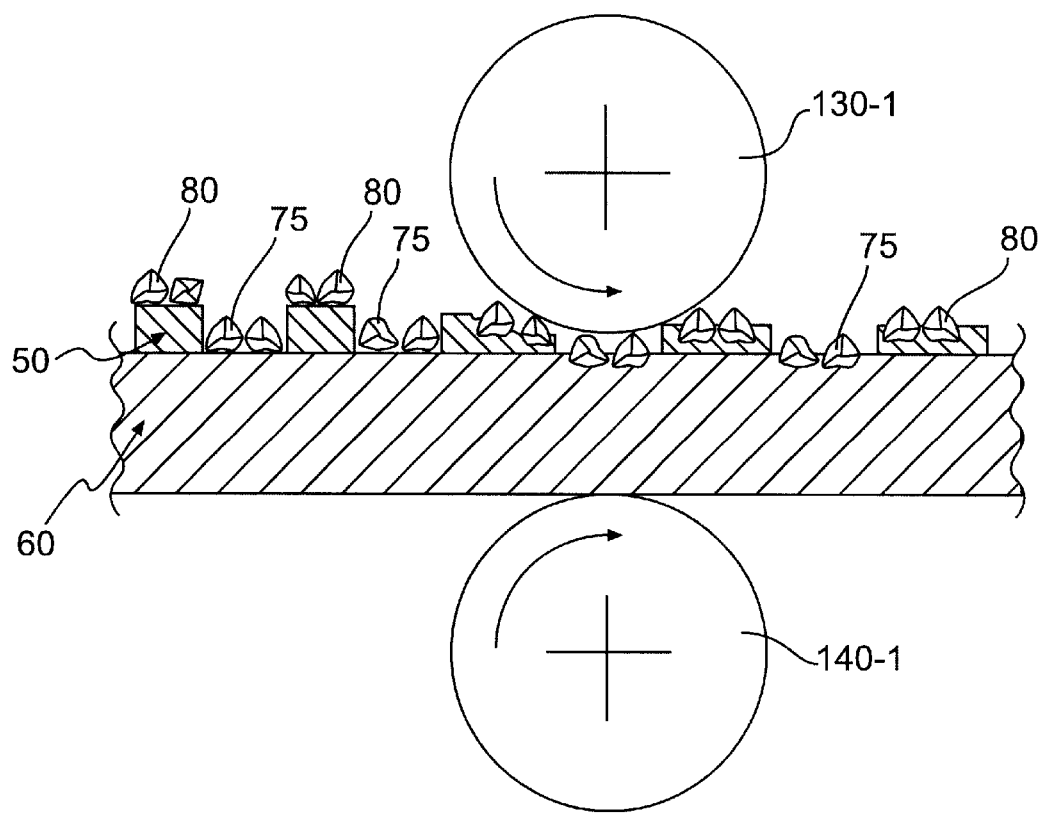
FIG. 13 is a schematic view similar to FIG. 10 showing compaction of the particles and the mask.

Compaction of carrier 60 and the urging of hard particles 75 into the carrier as shown in FIGS. 9B and 10 can be performed before removing mask 50 as shown in FIG. 13. Preferably this is when mask 50 is thin, or deformable or elastic or resilient. Under action of compacting means, such as plates 79 or rolls 130-1 and 140-1, mask 50 is compressed, hard particles 80 are urged at least partially into the mask and hard particles 75 are also urged into carrier 60. After mask 50 is removed, the resulting material is similar to that shown in FIG. 11.

It should be understood that roll compaction is just one of many available options to compact carrier 60 and/or urge hard particles 75 into it. The compacting means can be flat, corrugated, rectangular, round, etc. The compacting means can be a part of or attached to an electrical, hydraulic, pneumatic, vibratory (including ultrasonic) machine.

Figure 14:
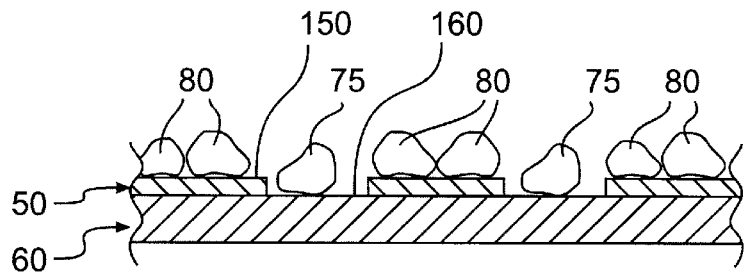
FIG. 14 is a view similar to FIGS. 7 and 8 showing yet a further variation between the size of the particles and the mask.
Figure 15:
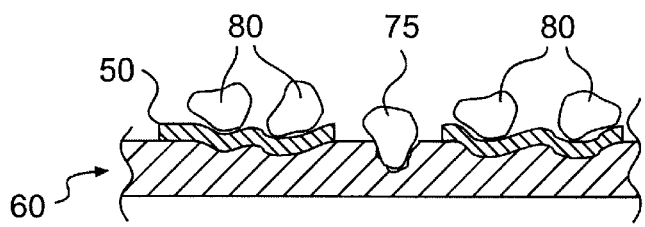
FIG. 15 shows the material of FIG. 14 compacted.
Figure 16:
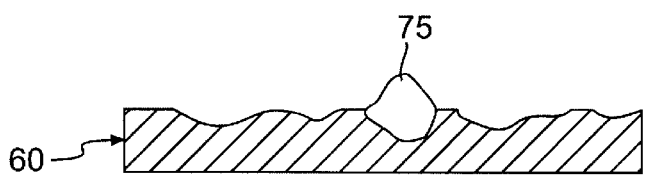
FIG. 16 shows the material of FIG. 15 with the particles retained by a supplementary retention material.

An embodiment when mask 50 is a thin substance relative to the linear dimensions of the hard particles 80 and 75 (e.g., $3.0 \times 10^{-1}$ to $1.0 \times 10^{-6}$ of a linear dimension of the hard particles) is illustrated in FIGS. 14-16. FIG. 14 shows hard particles 80 positioned on an outer surface 150 of mask 50, and hard particles 75 on an outer surface 160 of carrier 60. FIG. 15 shows the structure after the hard particles 80 and 75 are urged (by compacting means such as shown in FIGS. 10 and 13) into mask 50 and carrier 60 respectively. FIG. 16 shows the structure of carrier 60 and the particles 75 embedded therein after separation of mask 50 and the particles 80 adhered to it from the carrier.

Further treatment of the compressed carrier 60 containing hard particles 75 to provide permanent retention of the particles can comprise a variety of methods including, but not limited to, heating, sintering, braising, fusing, curing, and any combination of them, all with or without pressure and/or with or without vacuum; thermal spraying and electro-depositing; all performed in a continuous and/or semicontinuous and/or batch manner;-and any combination of them. Many of these processes are disclosed in the above-referenced U.S. patents including U.S. Pat. No. 5,203,880, the contents of which is incorporated herein by reference.

As before, the level of protrusion of the hard particles 75 into and/or out of carrier 60 can vary from 0–100%.

Figure 16A:
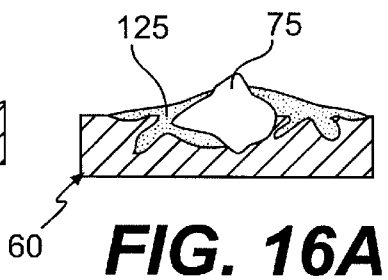
FIG. 16A shows the material of FIG. 16 with a supplemental retention material applied it.

FIG. 16A shows an abrasive material made from a compacted carrier 60 containing hard particles 75, only one being shown, using an optional supplementary retention material 125, that has penetrated into the carrier 60.

Figure 17:
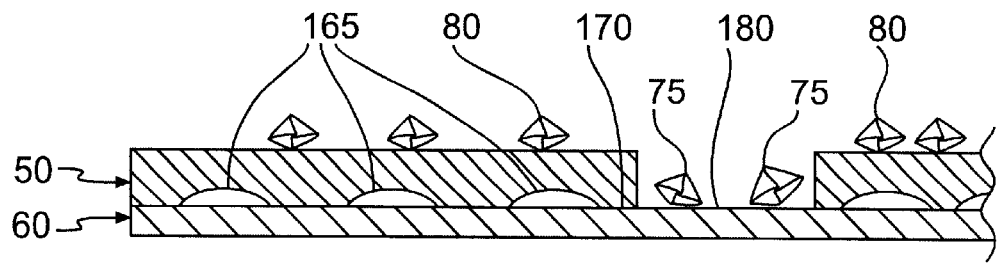
FIG. 17 is a view similar to FIG. 5 showing an alternative for the mask.

FIG. 17 shows a mask 50 having a plurality of pockets or channels 165 on at least the side 170 of the mask that is to be against the surface 180 of carrier 60 carrying hard particles 75. Under some compression force (e.g., as show in FIG. 13) and/or a vacuum, air is removed at least partially from these pockets 165 to seal the mask to surface 180. As a result, mask 50 sticks to surface 180 of the carrier. This design of the mask and method of application allows for easy separation of the mask from the carrier (e.g., as shown in FIG. 9). Other methods (e.g., releasing vacuum) letting air penetrate into these pockets 165 may be employed. In spite of the necessity of having to make a special mask comprising pockets 165, this method can be more advantageous than temporarily adhering mask 50 and carrier 60 with an adhesive 90 or other material because removal of the adhesive from the carrier can require an additional stage in the manufacturing process. Pockets or channels 165 can be made by a variety of methods including but not limited to compression, molding, etching, and microreplication.

The masks used in this invention can be made out of or utilize a variety of materials of different classes and origins including metallic, alloy, and non-metallic materials; organic materials, e.g., esters; silk; textiles; papers; foils, films, thin films, tapes, sheets and plates. The masks and/or adhesives used can be tacky materials and glues; pressure sensitive adhesives; one- and double sided adhesive materials (preferably in the form of tapes, sheets and plates); pressure sensitive adhesive tapes; plastics; resins; rubbers; pastes; glasses; ceramics, fiber glasses; gels; mesh type materials including wire mesh filters, woven and non-woven meshes, expanded, punched, cut, drilled and otherwise machined and/or deformed materials; powder and/or fiber materials, including cast, compacted and at least partially sintered materials; and any combinations of these with or without other materials. The mask preferably should be deformable and/or elastic and/or resilient. The thickness of the mask is not limited, but preferably should be comparable with the linear dimensions of the hard particles or substantially smaller (i.e., 2.0 to $10 \times 10^{-6}$ of a linear dimension/size of the hard particles).

Processes for making the masks include laser discharge, punching or cutting as well as electrochemical etching processes. Many processes, including laser punching, can provide masks of substantial sizes (e.g., 24 inches wide, 100 ft. long) or masks in the form of the wound roll, a hole cylinder (so called drum), or continuous belts with or without seams. As an example, a pressure sensitive adhesive sheet or tape (one- or double sided) can be converted into a mask by a laser punching tool, that cuts or punches through openings in the tape.

The mask may have different adhesive properties on different sides of the mask. For example, the side of the mask adjacent to the carrier may have a low tacky ability relative to the surface of the carrier to facilitate easy separation of the mask from the carrier, while the side of the mask receiving the hard particles has a relatively strong adhesion to the hard particles to facilitate good adhesion of the hard particles to the mask and therefore minimize the falling of hard particles onto the carrier during separation of the mask and the carrier from each other.

The carrier can be made out of many materials, including but not limited to, metallic, alloy, and non-metallic materials; organic materials; silk; textiles; paper, foils, tapes, plates, plastics, resins; rubber; pastes; glasses, ceramics, fiber glasses; mesh type materials including wire mesh, filters, woven and non-woven meshes, expanded, punched, cut, drilled and otherwise machined and/or deformed materials; powder and/or fiber materials, including but not limited to, preforms, including, but not limited to, green , [] compacts, roll compacted materials, cast powders and/or fibers, sintered and/or partially sintered and/or infiltrated materials; and any combinations of them with or without other materials. The carrier can be a flexible, rigid, single layer or a composite, multi-layered one; can comprise one or several materials; can be a solid material or powder material before or after compaction and/or thermal processing, can comprise pores, including open pores and capillary channels. The carrier can be flexible, rigid, of non-porous or porous material, cast and rolled material; alloys, composite, powder non-sintered, pre-sintered and fully sintered material.

In a particularly preferred embodiment of this invention, a preform of sinterable matrix material , e.g., a cast powder preform is used as carrier 60. This preform is disclosed in U.S. Pat. No. 5,620,489, the contents of which are incorporated herein by reference. It can be utilized as cast and/or cured and/or pre-sintered and/or fully sintered. This cast material, in any of the above mentioned stages, as the carrier receives the hard particles that pass through the openings in the mask and allows them to be affixed to the carrier, for example, by urging the hard particles into it. This allows one to minimize the amount or not to use any adhesive materials at all for affixing the hard particles to the carrier 60. Such minimization or absence of the adhesive material contributes to the productivity and the quality of the final products.

Figure 18:
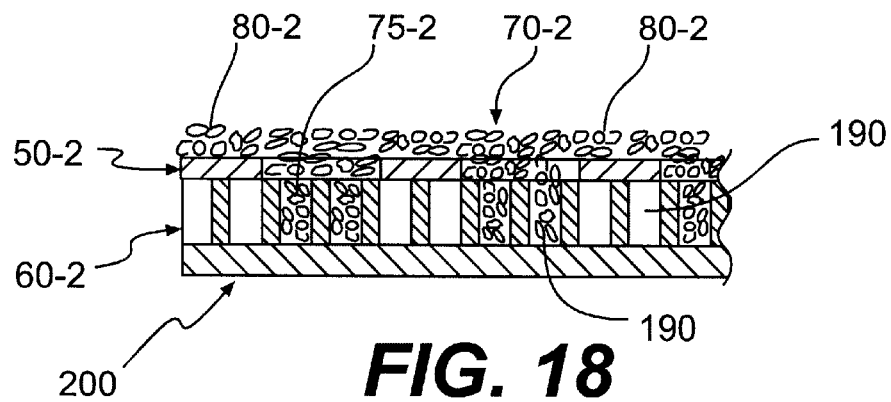
FIG. 18 is a view similar to FIG. 4 showing an alternative for the carrier.

While FIGS. 3–17 show carrier 60 as a solid material, e.g., a plate, foil or tape, FIG. 18 shows that the carrier 60-2 can be of a mesh or cellular type material. FIG. 18 is similar to FIG. 4 with respect to the stage in the process for making the abrasive material and shows a plurality of hard particles 70-2, a plurality of hard particles 75-2 within the openings 190 of the cellular carrier and a plurality of hard particles 80-2 on the mask 50-2. FIG. 18 also shows that the cellular carrier 60-2 is sealed from the side opposite mask 50-2 by a further material or carrier 200, that prevents hard particles from falling through the openings 190 that are not covered by the mask.

Figure 19:
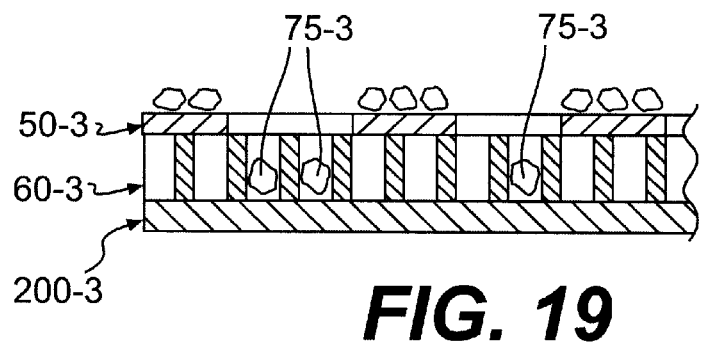
FIG. 19 is a view similar to FIG. 18 and showing a variation in the type of particles used.
Figure 19A:
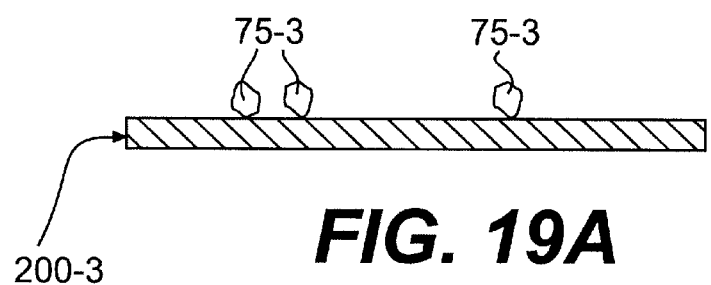
FIG. 19A is a view of the material of FIG. 19 after removal of the mask.

FIG. 19 is a modification of FIG. 18, and shows that a single layer of the hard particles 75-3 or one hard particle per cell can be formed within cellular carrier 60-3. It should be noted that relative to material 200-3, cellular carrier 60-3 could also play a role as a distributing mask and in this case carrier 200-3 would be a secondary carrier. Carrier 60-3 being a mask could also be removed from secondary carrier 200-3 leaving secondary carrier 200-3 with hard particles 75-3 on its surface according to the combined effect of mask 50-3 and carrier-mask 60-3. Secondary carrier 200-3 can be made out of the same materials and by the same ways as any carrier material 60. Further, the secondary carrier 200-3 and/or hard particles 75-3 can be processed the same ways as described above. FIG. 19A shows secondary carrier 200-3 of FIG. 19 after removal of mask 50-3 and mask-carrier 60-3, and prior to surrounding the hard particles with a retention matrix material.

In a particularly preferred embodiment,. the mask is a combination of a wire mesh and a double sided pressure sensitive adhesive tape with openings therein on one side. In this way, the particles will form a pattern on the carrier corresponding to the openings in the tape and the particles in each opening, a pattern corresponding to the wire mesh.

Figure 20:
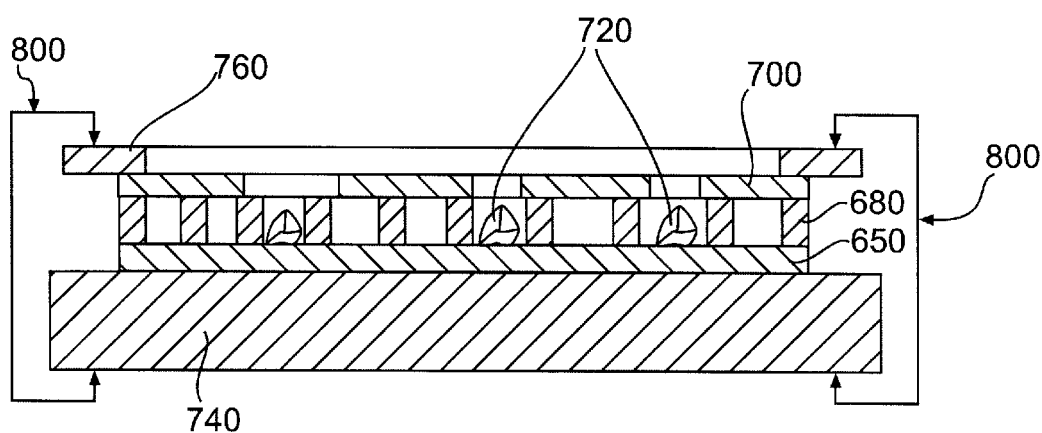
FIG. 20 is a schematic cross-sectional view showing a device for holding an assembly together.
Figure 21:
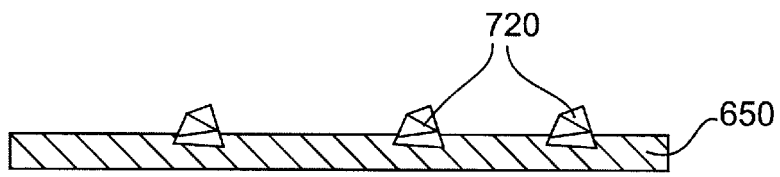
FIG. 21 shows the assembly of FIG. 20 after removal of the mask.

FIG. 20 illustrates a conventional holding means that can be used to keep a carrier and a mask tightly together in the process of filling and removing the hard particles. The figure shows a carrier 650, a cellular carrier-mask 680, a distributing mask 700, and hard particles 720 in the openings of the cellular carrier mask and opposing loading elements 760 and 740. The load, providing and controlling the pressure against elements 650, 680, and 700 and keeping them together, can be generated by the weight of the loading elements or by an additional weight load or mechanical force 800, e.g., application of pressure against the elements by a C-clamp, a magnetic field, etc. One can see that this way of holding the carrier and the mask together offers an easy way to separate them and remove hard particles that will not form a part of the final abrasive product. This principal of holding can be easily done by a semi-automatic or fully automatic (i.e., utilization of robots) machine. After removal of mask 700 and carrier-mask 680, if required, one obtains the structure shown in FIG. 21 of a carrier 650 with hard particles 720 distributed thereon and that also have been urged into the carrier.

For the purpose of this invention the terms "sinter," sintering." "sintering under pressure or hot compacting," "sintering in a solid state," "sintering in a liquid state," "liquid sintering," "partial sintering," "sintering with infiltration," "brazing," "fusing," "depositing," "thermal setting," "thermal spraying," "electro-depositing," "electroplating," and their synonyms and substitutes mean the same; namely consolidation of the components into a useful abrasive material and/or tool, and providing permanent retention of the hard particles (for the life of the hard particles in the abrasive article) on or without the carrier or the abrasive tool.

If the carrier is a metallic foil or plate or a fully sintered material or solid metal tool carrier (i.e., a steel) when adequate heat and/or pressure and/or atmosphere is applied to both the carrier and the retention material, this material is sintered or melts and plays the role of a brazing or fusing material, permanently affixing or attaching the hard particles in or to the carrier.

If the carrier is a powder composition and/or preform of a base retention material (e.g., a non-sintered or partially sintered Co—Ni—Fe powder composition optionally comprising a Ni—Cr—P additive,) a supplemental retention material (such as 125 in FIG. 12) can be used. When adequate heat and/or pressure and/or atmosphere is applied to both the carrier and the supplemental retention material, this supplemental retention material melts and infiltrates into the carrier. This material in its liquid phase penetrates into the pores of the base retention material filling them while at the same time some processes, (e.g., diffusion, decomposition, reduction, oxidation, graphtization, etching) between components of the base retention material, the supplemental retention material and hard particles can occur. Therefore in the process of infiltration, the supplemental retention material modifies the base retention material. At the same time this material and/or its components affix the hard particles to themselves and to the base retention material. As a result, the hard particles are retained by a combination of the sintered carrier and the supplemental retention material. This process can be called "sintering with infiltration" or "infiltration"; it also could be called "sintering with fusion," etc.

When heating takes place in a mold and pressure is applied against the carrier assembled with the hard particles. and/or the retention material or components of the retention material, the process is called "sintering under pressure" with or without liquid phase. The generation of the liquid phase depends upon the composition and combination of the carrier (which can be a retention material by itself and the retention material and their components.

To provide the strongest and most reliable integration and bonding of the hard particles, the retention or retaining matrix material should be a sinterable matrix material that is sintered in a mold under pressure with our without a protective and/or a negative pressure atmosphere. In addition, it should take place in a furnace with a protective and/or negative pressure atmosphere; and with a liquid phase generated by components of the carrier and/or a. supplemental retention material if present.

In a particularly preferred embodiment of this invention a soft, easy deformable powder preform of a sinterable matrix material as described in U.S. Pat. No. 5,620,489 is used as the carrier and a supplemental retention material in the form of a powder (by dusting onto at least the hard particles and/or the carrier) is used to assist in securing the hard particles in the desired pattern.

Figure 22:
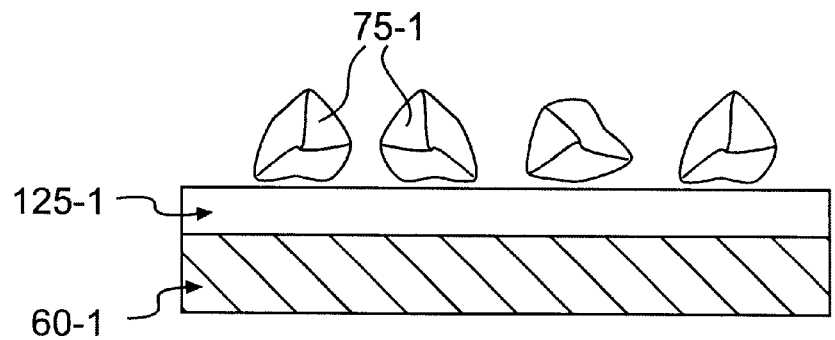
FIG. 22 is a view similar to FIG. 12 and showing an alternative method for fixing the particles in retaining matrix material.
Figure 23:
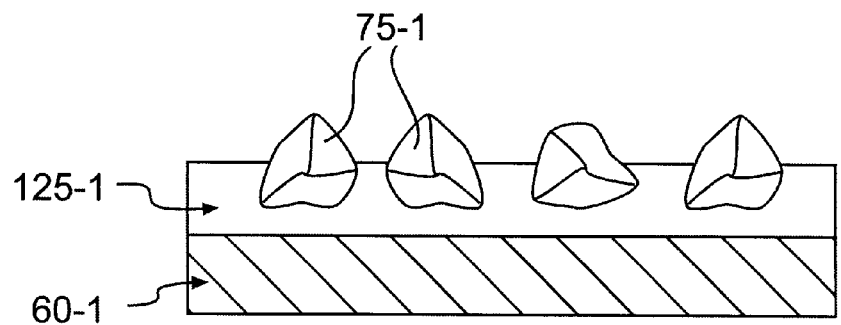
FIG. 23 is a view of the material of FIG. 22 after compaction.

FIG. 22 shows a modification of FIG. 12. The supplemental retention material 125 of FIG. 12 is shown here as a preform 125-1 that is placed against the carrier 60-1. The hard particles 75-1 are distributed on preform 125-1 in the desired pattern in the same manner as described above. FIG. 23 shows these particles 75-1 urged at least partially into the material 125-1 or, as shown in FIG. 24 also into the carrier 60-1 through the material 125-1.

Figure 24:
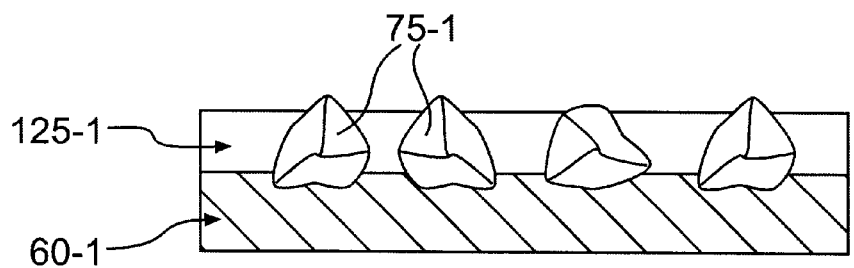
FIG. 24 is a view similar to FIG. 23 after increased compaction of the material.
Figure 25:
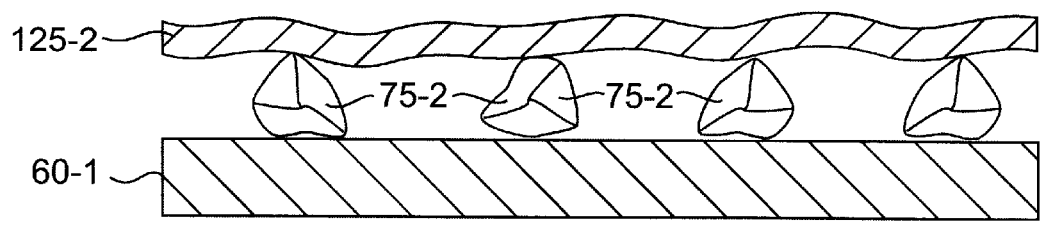
FIG. 25 is a view similar to FIG. 22 showing another alternative method for fixing the particles.
Figure 26:
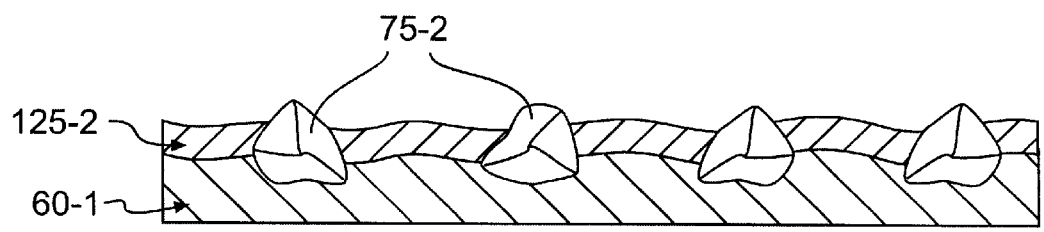
FIG. 26 is a view of the material of FIG. 25 after compaction.

FIG. 25 shows a modification of FIGS. 22-24. Here the material 125-1 of FIG. 22 is a preform 125-2 placed on top of the particles 75-2 which are distributed on carrier 60-1 in the desired pattern and in the same manner as described above. FIG. 26 shows these particles 75-2 urged at least partially into material 125-2 and the carrier. The hard particles can protrude from a surface of the preform 125-2 and the carrier. Means for providing protrusion of the hard particles over the retention surface are described in the U.S.

Pat. No. 5,203,880, the contents of which is incorporated herein by reference. These means, which include soft penetrable separators, can be utilized before or during heating to form the composite material.

The carrier for the particles can be a solid material that is used only to support the particles during processing and later discarded. In this case the particles, after being distributed on the carrier in the desired pattern in the same manner as described above, are surrounded with a retention material such as a sinterable matrix material which is then sintered to form an abrasive article with the particles embedded in and firmly held in place by the sintered material. The material can be provided by applying sinterable matrix powder over the particles or by providing a preform of sinterable matrix material over and/or under the particles and then urging the particles on the preform either before and or during sintering.

Alternatively, the material of the carder 60 itself can be of a retention material (i.e., cobalt, nickel, iron, manganese, molybdenum, tungsten, nickel—bronze compositions) that will integrate and bond with the hard particles. Sintering in a solid state, sintering under load or pressure in a furnace or mold of a sinter press are the best processes for such materials.

An option for the carrier is that it also include a supplementary, retention-reinforcing material (i.e., 0.5–10, but preferably 3–7 weight percent). Examples of such retention-reinforcement materials are low temperature braze filler materials, i.e., silver, copper, zinc and/or tin based materials and high temperature braze filler, fusing and hard facing materials. These retention-reinforcing materials preferably comprise at least some carbide forming metals of IVA, VA, VIA, VIIIA IIIB and IVB groups of the Periodic Table Of The Elements (i.e., chromium, titanium) and/or some metals of IB and IIB groups of the Table. Sintering in the presence of a liquid phase (up to 30%, preferably 2–15% of the liquid phase) and sintering with infiltration are the best options for such combination of materials. Sintering under load or pressure in a furnace or in the mold of the sinter press are preferred.

Another option for the material of the carrier is that it consist predominantly of supplementary, retention-reinforcing materials (more than 50 weight %) with optional additives as described above. Sintering in a liquid phase, sintering with infiltration or in some cases direct brazing and fusing are the best options for such combinations of materials.

A further option for the carrier 60 is that it consist of a material of any of the above and in addition is provided with a further supplementary retention material as shown in FIG. 12. The supplementary retention material can comprise at least some carbide forming metals of IVA, VA, VIA, VIIA IIB and IVB groups of the Periodic Table Of The Elements (i.e., chromium, titanium) and/or some metals of IB and IIB groups of the Table.

Therefore for the purpose of this invention and, in general, for the purpose of producing abrasive articles comprising hard particles retained by a retaining matrix, preferably in a non-random manner, and preferably retained by predominantly metallic components, it is not important which specific process (sintering, infiltration, etc.) is used to permanently retain the hard particles.

It should be understood that the above disclosed single layered materials can also be in multiple layer form by assembling various single layers together and consolidating them into a unitary assembly with and/or without adding supplementary parts to the assembly. Examples of such processing include thermal setting, vulcanization, sintering, braising (all in a mold, furnace; by induction, conventional, resistant heating; by flame/torch, adhesive, epoxy, glue, etc.).

Additional structural elements, such as supports, interdays, tool working surfaces and tool carriers can be added or assembled with the composite material or its assembly and used as the carrier. This assembly can be made prior to and/or after final processing of the composite material, e.g., prior to or after sintering.

The hard particles can be chosen from any kind and type of natural and synthetic materials providing an abrasive quality, e.g., diamonds (natural, synthetic and polycrystalline); nitrides (e.g., cubic boron nitride) carbides, borides, or any mineral abrasives preferably of highest hardness or any combination thereof.

Articles made according to this method include abrasive and superabrasive single and multiple layer surfaces, tools and wear resistant articles and parts, tools for cutting, grinding, roughening, drilling, dressing, polishing, lapping. Examples of these articles include, but are not limited to, face and rotary grinding discs, drums and dressers; segments; replaceable/disposable abrasive segments and parts for the abrasive tools and wear resistant articles;.circular and reciprocating segmented and continuous rim blades, drill bits; beads for wire saws.

The useful abrasive parts for the abrasive and wear resistant articles and parts can be obtained by extracting (i.e. by water jet and/or laser) the useful abrasive parts from the unitary structure as disclosed in the U.S. Pat. No. 5,791,330 and co-pending U.S. patent application Ser. No. 09/448,840 entitled "Method for Making a Sintered Article and Products Produced Thereby." The extracted parts can then be integrated together, for example, by brazing, welding, or sintering and used as a single unit.

With reference to FIG. 12, when the particles are brazed or fused to the carrier, and the carrier is a solid material like a steel foil or plate or pre-sintered or fully sintered and the particles are at least partially urged (indented, embedded) into this carrier for temporary retention, permanent retention of the particles in the carrier can be provided by supplying material in the form of brazing or fusing powder or preform (optionally and preferably with a flux) prior to or after positioning or urging the particles into the carrier. A heat process will then melt the material and braze it thereby securing the particles to the carrier.

If the carrier is a solid material or a fully sintered substance (i.e., with a predominately closed residual porosity of 0–5%) and there is no penetration of the particles into it, the molten material braze will fuse the hard particles to the carrier. In this case there is no substantial physical penetration of the molten material into the carrier. The carrier 60, as a solid or properly pre-sintered substance will not shrink in the process of heating. A furnace, including a sinter or special braising furnace (preferably with vacuum), induction fixture, open flame/torch can be used to provide the necessary heat for this process.

For braising diamonds, one can use nickel or cobalt based fusing and braising filler metallic powders and. preforms, preferably comprising carbide forming elements such as chromium, titanium, boron, silica. Compositions (in weight percents) "4-25%Cr, 0–10% P, 2–3% B, 0–10% Si, 0–4% Fe, 0–15% W, 0–37% Mn, 0–5% Cu, 0–5 Ta, 0–4% Al, 0–0.02% Y, 0–0.05% La, 0–0.03% Re, Ni and/or Co—balance" are readily available in the form of powders and/or pastes and/or preforms (tapes) from Sulzer Plasma Tecknik, Inc. (Troy, Mich.) (the material known as AMDRY Braizing Materials), Wall Colmony Corporation (Madison Heights, Mich.) (the material known as Colmony Hard Facing Alloys and High Temperature Brasing Filler Metals), Coast Metals (Friendswood, Tex.) (the material known as Hard Facing Alloys) and Lucas-Mihaupt, Inc. of A Handy & Herman Company (Cudahy, Wis.) (the materials known as High temperature Braising Alloys and Low Temperature Braising Alloys).

The same materials set forth above and/or their components (i.e., cobalt and/or nickel) can be used as the carrier in a form of powder or un-sintered or partially sintered powder preform, all comprising substantial open porosity (i.e., 90 to 30%). The same materials as shown also can be used as a supplemental retention material in the form of a powder, paste or preform. In this case since the powder or preformed. carrier has substantial open porosity it will shrink in the process of heating. There are two predominate processes taking place during heating: (1) diffusion between powder components of the carrier, accompanied with a shrinkage and often shape distortion of the carrier and its strength increase, and (2) of the supplemental retention materials, if present, and penetration, infiltration of the molten phase into open pores of the carrier in the process of its heating and porous reduction. It should be noted that the carrier or its components can also generate a liquid phase at the same or low temperature as the retention material. One can describe a combination of these two processes as sintering or sintering with infiltration or sintering in the presence of the liquid phase. Because of the tendency for shrinkage and distortion in the process of heating that can displace the hard particles from their affixed positions in the carrier, the application of heat should preferably be accompanied with weight loading or pressure against the assembly of the carrier and the hard particles. This process can be performed in a furnace or in so-called sinter press and is usually referred to as hot compacting or sintering under pressure.

Other embodiments of the invention will be apparent to hose skilled in the art from consideration of the specification and practice of the invention disclosed therein. It is intended that the specification and specific embodiments be considered as exemplary only, with the true scope and spirit of the invention being indicated by the following claims.

What is claimed is:

1. A method for making an abrasive material comprising a plurality of hard abrasive particles distributed in a retaining matrix for holding said particles in place, said method comprising the steps of placing a mask having openings therein against a carrier for supporting a plurality of said particles, providing affixing means on an outer side of said mask remote from said carrier to which hard particles will adhere, applying a plurality of hard particles to said outer side of said mask so that a portion of the particles pass through the openings of the mask and form a pattern of said particles on said carrier corresponding to the openings of the mask and another portion of the particles adhere to said mask, separating the mask containing the hard particles adhered to it from the carrier leaving the pattern of said particles on the carrier, at least partially surrounding the particles on the carrier with a sinterable matrix material,. and heating said sinterable matrix material to cause said material to form a retaining matrix that holds said particles in said pattern and thereby form said abrasive material.

2. The method of claim 1, wherein the carrier is a preform of sinterable matrix material.

3. The method of claim 2, wherein the particles are at least partially surrounded by the sinterable matrix material by urging said particles at least partially into said preform.

4. The method of claim 3, wherein the particles are urged into the preform during heating of the material.

5. The method of claim 3, wherein the particles are urged into the preform before heating the material.

6. The method of claims 3, 4, or 5 wherein the preform of sinterable matrix material has hard particles distributed therein.

7. The method of claim 1, wherein the particles are at least partially surrounded by the sinterable matrix material by applying sinterable matrix material to said particles and carrier after separating the mask from said carrier.

8. The method of claim 1, wherein said carrier has an adhesive coating on it to which the particles that pass through the openings in the mask adhere.

9. The method of claim 1, wherein the carrier forms a part of the abrasive material.

10. The method of claim 1, wherein the carrier is a mesh material.

11. The method of claim 10, wherein the mesh material forms a part of the abrasive material.

12. The method of claim 1, wherein the carrier is removed from the abrasive material after heating of the sinterable matrix material.

13. The method of claim 1, wherein the side of the mask adjacent said carrier is also provided with affixing means to temporarily affix the mask to said carder while the particles are applied thereto, which adhesive is removed with the mask when the mask is separated from the carrier.

14. The method of claim 13, wherein the affixing means for the mask is a coating of adhesive.

15. The method of claim 1, including urging the particles into the carrier through the openings in the mask before the mask is separated from the carrier.

16. The method of claim 1, including urging the particles into the carrier after the mask is removed and before they are at least partially surrounded with the sinterable matrix material.

17. The method of claim 8, wherein particles not adhering to the mask or carrier are removed before the mask is separated from the carrier.

18. The method of claim 1, wherein the mask has a plurality of openings of the same shape.

19. The method of claim 1, wherein the affixing means comprises a layer of adhesive on the outer side of said mask.

20. The method of claim 1, wherein the mask is a pressure sensitive adhesive tape with the adhesive on the tape providing said affixing means.

21. The method of claim 1, wherein the mask is a double-sided adhesive tape, the adhesive on one side providing the affixing means and on the other for temporarily affixing the mask to the carrier while the particles are applied thereto.

22. The method of claim 1, wherein the mask is separated from the carrier by coiling it into a roll.

23. The method of claim 1, including urging the particles into the carrier before heating of the sinterable matrix material.

24. The method of claim 23, wherein the particles are urged into the carrier after the mask is removed.

25. The method of claim 23, wherein the particles are urged into the carrier before the mask is removed.

26. The method of claim 1, including applying a supplemental retention material to the particles on the carrier before heating of the sinterable matrix material.

27. The method of claim 26, wherein the supplemental retention material is a meltable material that melts at a temperature lower than the sinterable matrix material.

28. The method of claim 26, wherein the supplemental retention material is a braze material.

29. The method of claim 1, wherein the sinterable matrix material is a braze material.

30. The method of claim 1, wherein the sinterable matrix material includes a braze material.

31. The method of claim 1, wherein pressure is applied to the carrier and the particles during heating of the sinterable matrix material.

32. A method for making an abrasive material comprising a plurality of hard abrasive particles distributed in a retaining matrix for holding said particles in place, said method comprising the steps of placing a mask having openings therein against a carrier for supporting a plurality of said particles, applying a plurality of hard particles to an outer side of said mask remote from said carrier, whereby a portion of the particles pass through the openings of the mask and form a pattern of said particles on said carrier corresponding to the openings of the mask and another portion of the particles remain on the outer surface of said mask, adhering said particles on the outer surface of said mask to the mask, separating the mask containing the hard particles adhered to it from the carrier leaving the pattern of said particles on the carrier, at least partially surrounding the particles on the carrier with a sinterable matrix material, and heating said sinterable matrix material to cause said material to form a retaining matrix that holds said particles in said pattern and thereby form said abrasive material.

* * * * *

UNITED STATES PATENT AND TRADEMARK OFFICE
CERTIFICATE OF CORRECTION

PATENT NO. : 6,478,831 B2
DATED : November 12, 2002
INVENTOR(S) : Naum N. Tselesin It is certified that error appears in the above-identified patent and that said Letters Patent is hereby corrected as shown below:

Title page,
Item [60], Related U.S. Application Data, "Patent No. 6,273,083" should read
-- Patent No. 6,273,082 --.

Column 15,
Line 59, after "material," delete the period.

Column 16,
Line 26, "carder" should read -- carrier --.

Signed and Sealed this

Nineteenth Day of August, 2003

JAMES E. ROGAN
*Director of the United States Patent and Trademark Office*